United States Patent [19]

Carreno

[11] Patent Number: 5,080,556
[45] Date of Patent: Jan. 14, 1992

[54] THERMAL SEAL FOR A GAS TURBINE SPACER DISC

[75] Inventor: Diether Carreno, Schenectady, N.Y.

[73] Assignee: General Electric Company, Schenectady, N.Y.

[21] Appl. No.: 589,501

[22] Filed: Sep. 28, 1990

[51] Int. Cl.[5] .............................................. F01D 11/00
[52] U.S. Cl. ............................ 415/170.1; 415/171.1; 415/174.5; 416/198 A; 277/53; 277/56; 277/193
[58] Field of Search .............. 415/170.1, 171.1, 173.1, 415/173.3, 173.5, 173.6, 174.2, 174.5, 134, 136, 139, 110, 111, 112, 128, 196; 416/198 A; 277/53, 55, 56, 193, 221, 167.3

[56] References Cited

U.S. PATENT DOCUMENTS

| | | | |
|---|---|---|---|
| 4,127,359 | 11/1978 | Stephan | 416/198 A |
| 4,251,083 | 2/1981 | Montes | 277/221 |
| 4,420,161 | 12/1983 | Miller | 277/56 |
| 4,979,755 | 12/1990 | Lebreton | 415/174.5 |
| 5,002,288 | 3/1991 | Morrison et al. | 415/174.5 |

FOREIGN PATENT DOCUMENTS

| | | | |
|---|---|---|---|
| 0018209 | 1/1984 | Japan | 415/174 |
| 0070815 | 4/1984 | Japan | 415/174.5 |
| 0601435 | 4/1978 | U.S.S.R. | 415/111 |

*Primary Examiner*—Edward K. Look
*Assistant Examiner*—Christopher M. Verdier
*Attorney, Agent, or Firm*—Nixon & Vanderhye

[57] ABSTRACT

The present invention provides for the removable attachment of sealing segments about the entire circumferential periphery of the rotor spacer discs. To this end, the conventional annular grooves provided in the peripheral surface of each spacer disc (as part of the high/low sealing surface configuration) are reconfigured as dovetail grooves which are designed to receive complimentary or mating portions of the sealing segments. In other words, each adjacent annular groove receives a plurality of sealing segments, the totality of which substantially prevent or at least minimize the impingement of hot gases directly on the peripheral surface of the spacer disc.

20 Claims, 3 Drawing Sheets

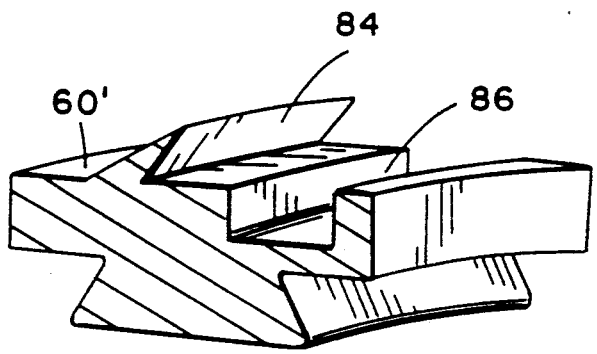
FIG. 5
FIG. 6
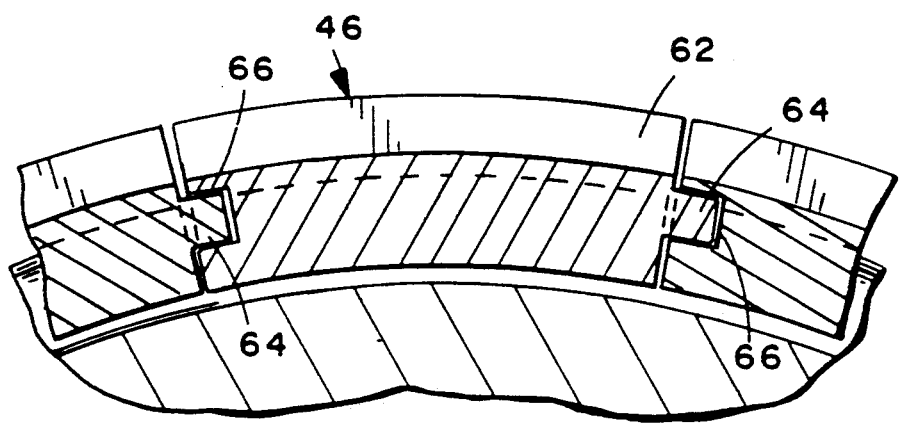
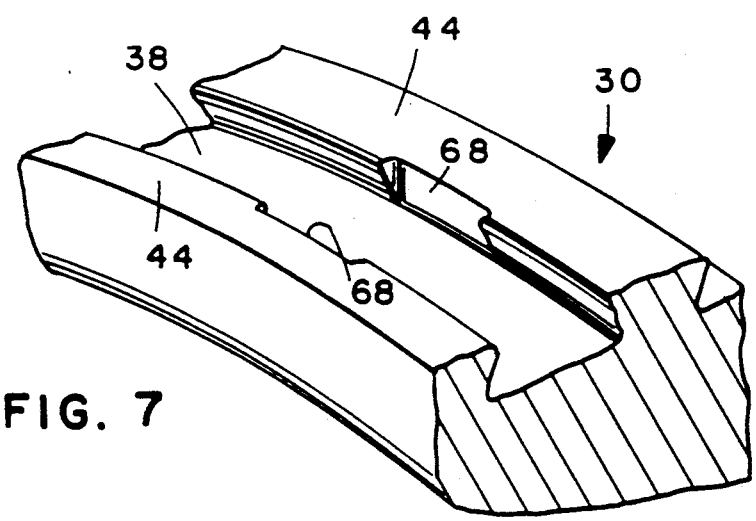
FIG. 7

THERMAL SEAL FOR A GAS TURBINE SPACER DISC

BACKGROUND AND SUMMARY OF THE INVENTION

In modern gas turbines, requirements for high efficiency and output have resulted in significant increases in operating temperatures. This, in turn, has led to the design and construction of composite rotor structures using different materials. It has also led to the development of numerous complicated and costly internal flow circuits for delivering cooling air to the various portions of the gas turbine, including those exposed to the hot gas, to accommodate operation at increased temperatures.

A major problem in high-efficiency, high-temperature gas turbine operation has been non-uniform heating and cooling of rotor discs and the spacer discs which are sandwiched between adjacent rotor discs. For example, during transient operating conditions, i.e., start-up and other changes in speed between start-up and the turbine's rated speed, there is a significant temperature differential between the outer peripheral parts of the turbine discs, including the buckets, and the inner portions of the rotor discs. Similar temperature differentials occur between the outer and inner portions of the spacer discs. These essentially radially oriented, thermal gradients cause high thermal stresses which, in turn, can shorten the useful lives of the components. With specific regard to the spacer discs, damage to the conventional high/low sealing periphery of the spacer disc (which cooperates with an adjacent stationary structure with a complementary high/low surface configuration) cannot be readily repaired, leading to expensive rotor teardowns and even scrapping of the entire spacer disc.

This invention relates to a thermal sealing arrangement which substantially prevents hot interstage gases from impinging on the peripheral surfaces of the spacer discs in a gas turbine, thereby creating lower temperature gradients and stresses, and thus extending the service life of such discs and providing other benefits as explained below.

Specifically, the present invention provides for the removable attachment of high temperature sealing segments about the entire circumferential periphery of the rotor spacer discs. To this end, the conventional annular grooves provided in the peripheral surface of each spacer disc (as part of the high/low sealing surface configuration) are reconfigured as dovetail grooves which are designed to receive complimentary or mating portions of the sealing segments. In other words, each adjacent annular groove receives a plurality of sealing segments, the totality of which substantially prevent or at least minimize the impingement of hot gases directly on the peripheral surface of the spacer disc.

In another aspect of the invention, the utilization of discrete sealing segments on the periphery of the spacer discs also provides a structural basis for more advanced high/low sealing configurations.

At the same time, the potential for damage to the spacer discs per se is minimized in that the radial flexibility of the sealing segments permits the latter to radially retract upon the occurrence of any rubbing with the stationary component of the high/low sealing arrangement. Should wear occur on the segments themselves, they are easily removed and replaced, without time consuming teardowns.

Thus, in one exemplary embodiment of the invention, a plurality of dovetail type grooves are provided in the peripheral circumferential surface of each spacer disc of the gas turbine. Each groove slidably receives a plurality of sealing segments. Each segment has a base structure substantially complementary to the associated dovetail groove surfaces. Specifically, the base portion of each sealing segment includes a flat bottom surface, and a pair of inwardly and upwardly tapered surfaces which join with an upper portion of the segment which includes a substantially horizontal portion which is itself provided with an annular peripheral groove to maintain a high/low sealing surface configuration for establishing the otherwise known flow resistant path in cooperation with the complimentary surface configuration on the adjacent stationary structure.

The clearance between the surfaces of the lower or base portion of the sealing segments and the dovetail grooves is such that during rotation of the spacer disc, the sealing segments will be thrust radially outwardly as a result of the centrifugal forces exerted thereon, so that the upwardly and inwardly inclined surfaces of the sealing segments will sealingly engage the corresponding tapered surfaces of the dovetail grooves. This sealing engagement prevents direct impingement of hot interstage gases on substantial portions of the peripheral surface of the spacer disc. In this first described embodiment, it is possible for minimal amounts of hot gases to eventually contact other portions of the peripheral surface of the spacer disc by reason of clearance between adjacent segments in adjacent grooves. Nevertheless, the sealing segments provide a substantial heat barrier to the gases flowing in an axial direction across the spacer disc.

In another exemplary embodiment, the upper portions of the sealing discs are provided with asymmetrical horizontally extending flanges which are designed to sealingly engage similar flanges on adjacent segments in adjacent grooves so that a substantially complete thermal barrier is provided, preventing direct impingement of any hot interstage gases on the peripheral surfaces of the spacer disc.

In still another arrangement, a more advanced high/low sealing surface configuration is provided by profiling the upper portion of the sealing segments in a slightly more complex and asymmetric arrangement which presents a significantly more tortuous path for gases flowing axially across the surface of the spacer disc.

As a result of providing the thermal sealing arrangement as described above, the following advantages are obtained: (1) affective heat transfer resistance is provided to keep the rotor spacer discs at lower temperatures during transient conditions, thus reducing thermal stresses for improved service life; (2) more advanced high/low labyrinth seals are possible by utilization of segments profiled for optimum sealing effectiveness; (3) damaged or worn seals can be replaced in the field to reduce down time; (4) advanced seal designs can be incorporated into older field units for performance improvements; and (5) lower spacer disc thermal stresses permit a greater degree load sharing with adjacent turbine discs.

Other objects of the subject invention will become apparent from the detailed description of the exemplary embodiments of the invention which follows.

BRIEF DESCRIPTION OF THE DRAWINGS

FIG. 5 is a perspective view of a sealing segment in accordance with a third exemplary embodiment of the invention;

FIG. 6 is a partial side view illustrating the manner in which segments within a single groove are connected to each other; and FIG. 7 is a partial top perspective view of the spacer disc illustrated in FIG. 1, showing an opening in a spacer disc groove permitting introduction of the sealing segments within the grooves.

DETAILED DESCRIPTION OF THE DRAWINGS

Figure 1A:
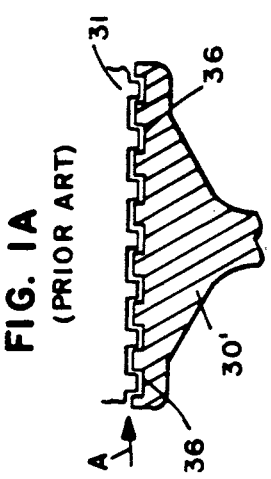
FIG. 1A is a partial cross section of a known space disc configuration.
Figure 1:
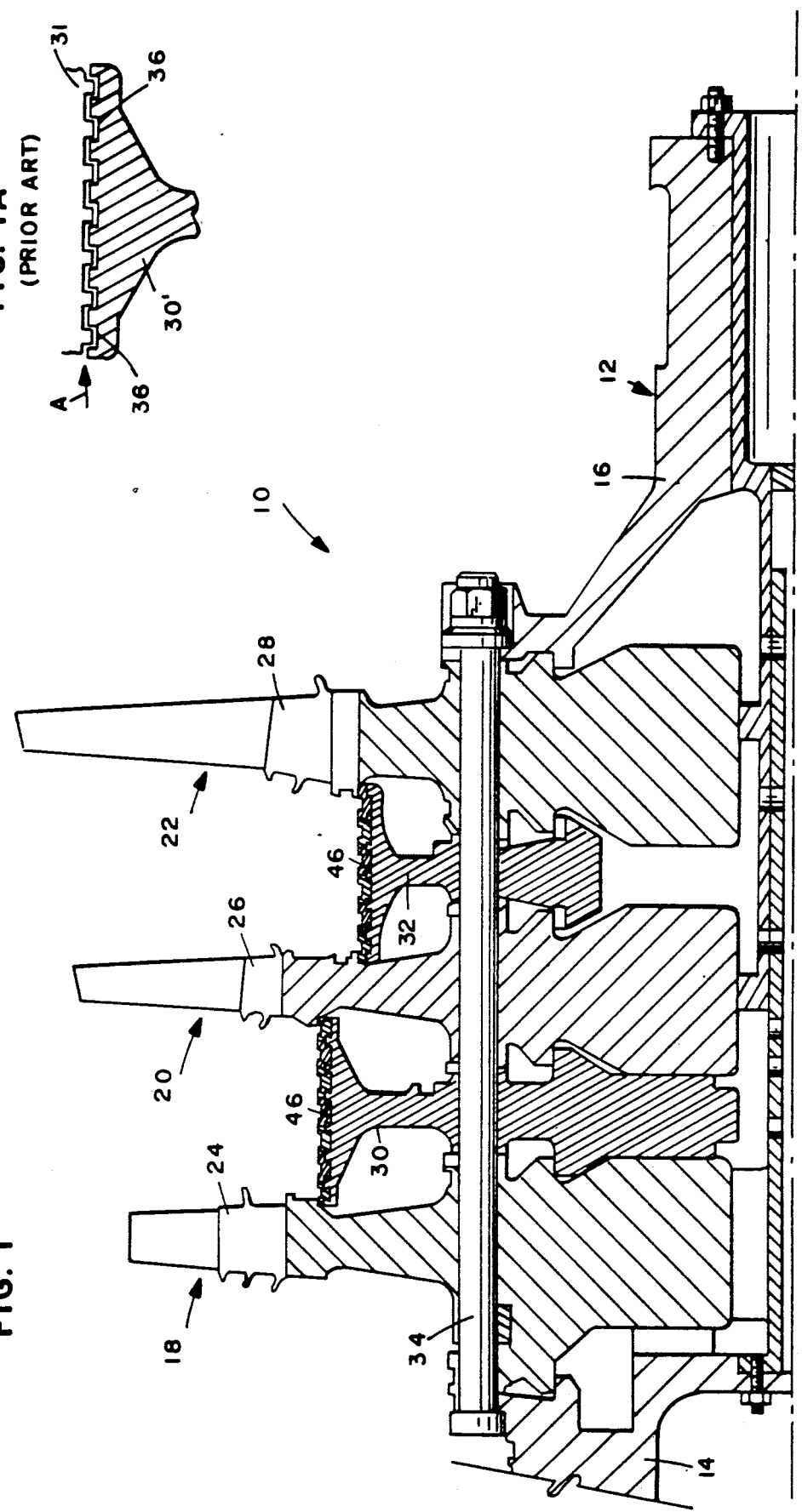
FIG. 1 is a fragmentary cross-sectional view illustrating a longitudinal section through the axis of a gas turbine constructed in accordance with the present invention.
Figure 2:
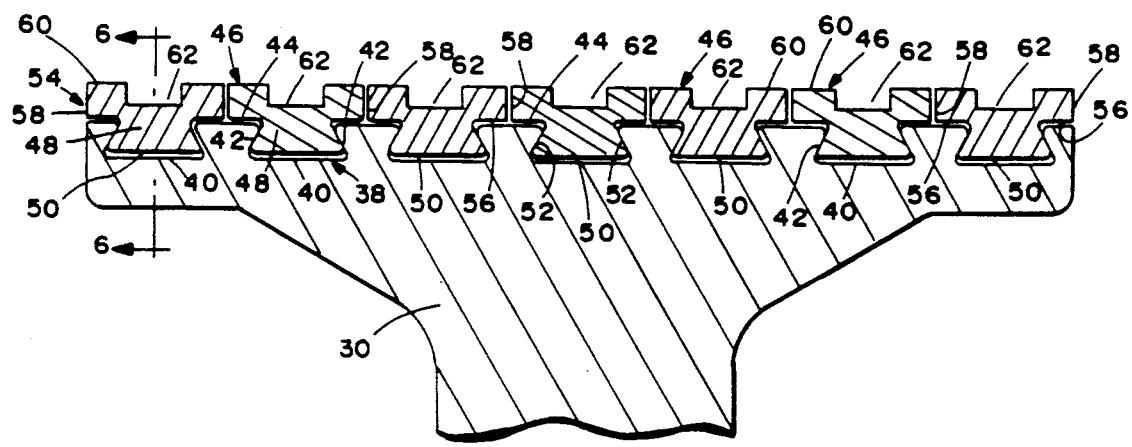
FIG. 2 is an enlarged detail taken from FIG. 1.

Referring now to the drawings, and particularly to FIGS. 1, 1A and 2, there is shown in cross-section a portion of the rotor structure of a gas turbine, generally designated 10. The gas turbine includes the usual compressor, combustors, outer casing and other ancillary structure, which will be apparent to those of skill in this art. As illustrated in FIG. 1, rotor structure 10 includes a shaft 12 having a forward flange 14 and an aft flange 16. On shaft 12, there is mounted a plurality of rotor discs, three being illustrated, and including a forward disc 18, an intermediate disc 20 and an aft disc 22. It will be appreciated that the present invention is useful with turbines having additional discs as well. Buckets 24, 26 and 28 are mounted about the outer periphery of rotors 18, 20 and 22, respectively. Spacer discs 30 and 32 are disposed between the forward and intermediate discs 18 and 20 and the intermediate and aft discs 20 and 22, respectively. Bolts, one being shown at 34, extend through the flanges 14 and 16 at the forward and aft ends of shaft 12 to secure the rotor discs and spacer discs in abutting relation one with the other, such that the rotor discs and spacer discs rotate together about the rotor axis. It will be appreciated that the foregoing-described rotor structure is conventional in the art and that there is substantial additional structure which is not disclosed herein but which those skilled in this art will understand as necessary to the operation of a gas turbine rotor.

With brief reference to FIG. 1A, it has been the practice in the past to provide the spacer disc 30' with a plurality of adjacent, annular grooves 36 about the entire peripheral surface thereof as part of a well known high/low labyrinth seal designed to minimize axial flow leakage in a direction perpendicular to the longitudinal direction of the grooves. These grooves, in combination with complimentary projections on an adjacent stationary component 31, create a tortuous path of resistance to such axial flow indicated by arrow A. This invention represents a significant improvement over the conventional seal arrangement in that not only is the conventional high/low sealing surface configuration maintained, but a thermal seal for the spacer disc itself is also provided.

With reference again now to FIG. 1 as well as to FIG. 2, the spacer disc 30 in accordance with an exemplary embodiment of this invention is provided with a series of dovetail grooves 38 which extend about the entire circumferential periphery of the disc. Each of the laterally spaced dovetail grooves 38 includes a flat base surface 40 and a pair of upwardly and inwardly tapered surfaces 42 which terminate at substantially flat peripheral surfaces 44. The dovetail groove and sealing segment construction will, of course, be incorporated into the disc 32 as well (and any additional spacer disc), but since they are essentially identical in terms of the groove/seal configuration, only the disc 30 need be described in detail here. It will also be understood that references to top, bottom, horizontal, vertical, etc. relate to the orientation of the disc 30 as it appears in FIG. 2, but are not otherwise intended to be limiting.

Within each of the dovetail grooves 38, there is slidably inserted a plurality of sealing segments 46 which are designed for mating engagement therewith. Specifically, each of the segments 46 includes a base portion 48 including a flat bottom surface 50, and tapered inwardly and upwardly directed surfaces 52; and an upper portion 54 which includes a pair of outwardly directed substantially flat surfaces 56, substantially vertically extending side walls 58 and a substantially flat top surface 60. A peripheral groove 62 is formed within the top surface 60 and extends longitudinally from one end of the segment to the other, in order to retain the benefits of the conventional high/low labyrinth seal.

The segments 46 are constructed of material chosen as an optimal balance between thermal, wear and strength properties for lowest cost. One presently preferred material is high temperature steel with low conductivity, but others chosen in accordance with the above criteria may be equally effective.

Figure 3:
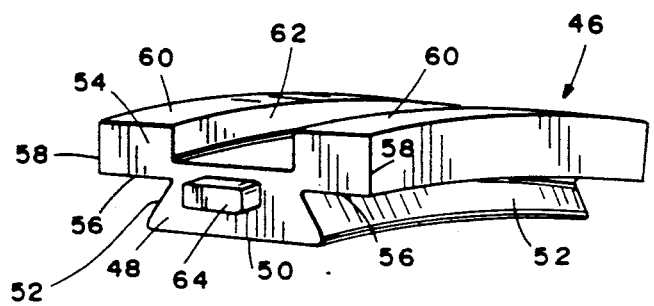
FIG. 3 is a perspective view of a sealing segment of the type illustrated in FIG. 2.

It will be appreciated that a plurality of such segments will be located in each of the annular grooves 38, so as to extend about the entire circumferential peripheral surface of the spacer disc 30. In order to maintain a sealing relationship between adjacent segments within a single groove, a projection and detent arrangement as shown in FIGS. 3 and 6 can be provided. Thus, a projection 64 on one segment will engage an associated detent 66 on an adjacent segment and, of course, this coupling arrangement will continue for each of the segments about the entire circumferential periphery of the associated dovetail groove 38.

Referring now to FIG. 7, for each of the dovetail grooves 38, the upper flat surfaces 44 may be provided with aligned cut-outs 68 to create an enlarged opening in the groove at at least one location about the periphery of the dovetail groove in order to permit the sealing segments to be introduced into the groove.

During operation of the turbine, and as a result of a predetermined clearance between the segments 46 and grooves 38, the various segments 46 will be thrust radially outwardly within the dovetail grooves 38 as a result of centrifugal force generated by rotation of the disc 30. The segments 46 will nevertheless maintain concentricity with the axis of rotation of the turbine rotor by reason of their symmetrical arrangement within the dovetail grooves. In this radially outwardly loaded condition, the surfaces 52 of each of the segments 46 will engage corresponding tapered surfaces 42 of the dovetail grooves 38 to thereby effect sealing arrangement between the two. The amount of radial movement of the segments 46 is small, but nevertheless sufficient to permit some reaction (by way of a radial retraction) in the event of frictional rubbing with the adjacent stationary component (e.g. component 31 in FIG. 1A) by reason of, e.g., excessive thermal expansion, etc.

While the above described embodiment permits some small amount of hot gas to penetrate between adjacent segments 46 in adjacent grooves 38, i.e., between adjacent side walls 58, there is nevertheless a substantial reduction in the amount of hot gas permitted to directly impinge on the peripheral surfaces 40, 42 and 44 of the disc 30. This lessens the temperature differential between the radial inner and outer portions of the disc and thus the thermal stresses, resulting in longer disc service life. At the same time, it will be appreciated that wear will occur on the segments 46 rather than the disc 30, and the segments are easily replaced via openings 68, thereby also leading to longer disc service life, and less down time for effecting such replacement.

As the speed of rotation of the disc 30 decreases, the segments will settle back within the dovetail grooves 38 so that the surfaces 56 of the segments will engage the flat surfaces 44 of the disc. There may or not be a clearance between surfaces 40 and 50 in the retracted position, depending on the chosen tolerances.

Figure 4:
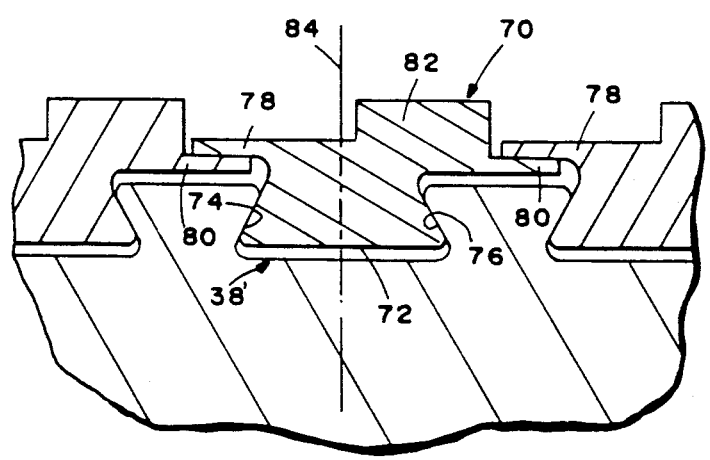
FIG. 4 is a partial cross sectional view of a spacer disc of the type shown in FIG. 1, but which has attached thereto sealing segments in accordance with a second exemplary embodiment of the invention.

With reference now to FIG. 4, another exemplary embodiment of a sealing segment is illustrated for sealing engagement within dovetail grooves 38' which are substantially identical to the dovetail grooves 38 in the FIG. 2 embodiment. The sealing segments 70 as shown in FIG. 4 each include a flat bottom surface 72 and upwardly and inwardly tapered sealing surfaces 74, 76 which merge into outwardly directed sealing flanges 78, 80, respectively. These flanges are, in turn, connected to an upper portion 82 of the segment. As will be appreciated from FIG. 4, flanges 78 and 80 are eccentrically oriented relative to the center line 84 of the segment. For example, flange 78 is at a higher vertical level than flange 80 (when viewed in cross section as shown in FIG. 4), and flange 78 extends a greater length from the upper portion 82 of the segment than does the flange 80. By this arrangement, an overlapping sealing arrangement is established between flange 78 and a flange 80 of the next adjacent segment to the left of segment 70. Similarly, the flange 80 of segment 70 sealingly engages the underside of the flange 78 of the segment to the right of segment 70. Thus, during rotation of the spacer disc 36, the outward loading of the sealing segments will not only create a seal where the tapered surfaces 74, 76 engage the tapered surfaces 42 of the dovetail grooves, but there will also be sealing engagement between the flanges 78 and 80 of adjacent segments, to thereby eliminate all direct impingement of hot gases in the peripheral surfaces of the disc 30.

With reference now to FIG. 5, still another sealing segment design is disclosed which includes an advanced labyrinth seal. The thermal seal created by the segment disclosed in FIG. 6 is substantially the same as that shown in FIGS. 1 and 2. In FIG. 5, however, the upper or peripheral surface 60' is provided with an inclined tooth-like projection 84 adjacent a groove 86. A similar complimentary member would be provided in the stationary component 31 so that an especially tortuous path would be created for axially flowing gases.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In an annular spacer disc mounted between and for rotation with a pair of rotor discs in a gas turbine, the spacer disc having an outer circumferential, peripheral surface, the improvement comprising; a plurality of laterally aligned, annular grooves formed in said peripheral surface, and a plurality of sealing members detachably secured within each of said annular grooves, said sealing members creating a thermal seal by preventing direct hot gas impingement on at least a substantial portion of said peripheral surface.

2. The spacer disc according to claim 1 wherein each of said sealing members comprises a plurality of interconnected segments.

3. The spacer disc according to claim 1 wherein said grooves are configured as dovetail grooves, each of which includes a substantially flat bottom surface, tapered side surfaces and substantially flat top surfaces, said top surfaces extending between adjacent ones of said grooves.

4. The spacer disc according to claim 3 wherein each of said sealing members has a base portion including a substantially flat bottom surface and tapered side surfaces, adapted for relatively loose mating engagement with said substantially flat bottom and tapered side surfaces of an associated one of said grooves, such that said sealing member moves radially between first and second positions.

5. The spacer disc according to claim 3 wherein each of said dovetail grooves is provided with an enlarged opening to facilitate insertion of said sealing member.

6. The spacer disc according to claim 4 wherein each of said sealing members includes an upper portion arranged symmetrically with respect to said base portion and a centerline of said sealing member.

7. The spacer disc according to claim 4 wherein each of said sealing members includes an upper portion arranged asymmetrically with respect to said base portion and a centerline of said sealing member.

8. A spacer disc for use in a gas turbine comprising:
 a disc body having an annular peripheral surface substantially parallel to an axis of rotation of said disc;
 a plurality of substantially parallel grooves formed in said peripheral surface and extending about the circumference thereof;
 a plurality of sealing segments removably secured within each of said grooves, such that substantially all of said peripheral surface is covered by said plurality of removable sealing segments.

9. The spacer disc of claim 8 wherein said sealing segments each have a base portion and an upper portion, and said upper portion includes a pair of laterally extending sealing surfaces arranged at different levels so that adjacent sealing segments in adjacent grooves overlap.

10. The spacer disc of claim 9 wherein each of said base portions and said grooves have substantially complementary cross-sectional shapes.

11. The spacer disc of claim 10 wherein said grooves are configured as dovetail grooves.

12. The spacer disc according to claim 11 wherein said sealing segments are movable between radially retracted and radially extended positions.

13. The spacer disc according to claim 9 wherein each of said upper portions includes a pair of horizontally oriented sealing surfaces and a peripheral groove centered within said upper portion.

14. The spacer disc according to claim 9 wherein each of said upper portions includes an angled annular projection and a non-centered annular groove.

15. The spacer disc according to claim 9 wherein each of said upper portions includes a pair of laterally extending sealing surfaces arranged at different levels so that adjacent sealing segments in adjacent grooves overlap.

16. The spacer disc according to claim 15 wherein each of said upper portions includes a projection asymmetric with respect to a centerline of said segment.

17. A spacer disc for mounting between adjacent rotor discs of a gas turbine, said disc having an annular peripheral surface provided with a plurality of adjacent, annular grooves, each of said grooves provided with a corresponding removable and replaceable means for creating a thermal barrier for preventing direct impingement of hot gases on said peripheral surface and for inhibiting axial flow of gases along said peripheral surface.

18. The spacer disc according to claim 17 wherein said means are slidably received within said grooves.

19. The spacer disc according to claim 18 wherein said means include surfaces arranged in overlapping relationship located between said grooves.

20. The spacer disc according to claim 18 wherein said means include surfaces arranged in face to face relationship between said grooves.

* * * * *